United States Patent [19]

Dinkjian et al.

[11] Patent Number: 5,416,911
[45] Date of Patent: May 16, 1995

[54] PERFORMANCE ENHANCEMENT FOR LOAD MULTIPLE REGISTER INSTRUCTION

[75] Inventors: Robert M. Dinkjian; Fredrick W. Roberts, both of Woodstock; David A. Schroter, Wappingers Falls, all of N.Y.

[73] Assignee: International Business Machines Corporation, Armonk, N.Y.

[21] Appl. No.: 12,216

[22] Filed: Feb. 2, 1993

[51] Int. Cl.⁶ .............................................. G06F 9/38
[52] U.S. Cl. ................................... 395/375; 395/775
[58] Field of Search .............................. 395/775, 375

[56] References Cited

U.S. PATENT DOCUMENTS

| | | | |
|---|---|---|---|
| 4,287,561 | 9/1981 | Liptay | 364/200 |
| 4,907,147 | 3/1990 | Saito et al. | 364/200 |
| 4,992,938 | 2/1991 | Cocke et al. | 364/200 |
| 5,005,118 | 4/1991 | Lenoski | 364/200 |

FOREIGN PATENT DOCUMENTS

0368332A2  5/1990  European Pat. Off. .

OTHER PUBLICATIONS

Losq, J. J., "Address Generate Interlock Memory Buffer", IBM Technical Disclosure Bulletin, vol. 25, No. 1, Jun. 1982.
Nair, R., et al., "Efficient Handling of Load Multiple Instruction", IBM Technical Disclosure Bulletin, vol. 25, No. 4, Sep. 1982.
Rao, G. S., "Use of Load Bypass on Load Multiple Instruction to Reduce Address Generation Interlock Delays", IBM Technical Disclosure Bulletin, vol. 25, No. 5, Oct. 1982.

Primary Examiner—Jack B. Harvey
Assistant Examiner—John Travis
Attorney, Agent, or Firm—Lynn L. Augspurger; Peter Visserman

[57] ABSTRACT

In a pipeline processor, the identities of the highest and lowest numbered registers of a subset of general registers affected by a load multiple register (LMR) instruction are stored. The number of the lowest numbered registered of the subset is incremented as the registers are loaded. In the event that a next sequential instruction requires the contents of one of the registers in the subset, the number of the required register is compared with the incremented number and the decoding phase of the next instruction is allowed to proceed when the required register has been loaded as indicated by the incremented number. The identity of the highest numbered and the next to highest numbered registers loaded by the LMR instruction are recorded in a target register and an exclusive or-circuit is provided to determine whether the total number of registers loaded by the LMR instruction is an even number or an odd number. The output of the exclusive or-circuit is used to determine whether the next-to-highest numbered register is by-passable for use in the operand fetch phase of the next instruction prior to completion of the last execution cycle of the LMR instruction.

10 Claims, 4 Drawing Sheets

(EVEN)

(ODD)

PERFORMANCE ENHANCEMENT FOR LOAD MULTIPLE REGISTER INSTRUCTION

BACKGROUND OF THE INVENTION

1. Field of the Invention

The invention relates to high-performance computers and particularly to computer processors using an instruction pipeline and including an instruction which loads a plurality of registers.

2. Background Art

The high-performance processors using instruction pipelines are well known. Typically, in such processors an instruction defining specific actions to be performed by the processor is executed in a sequence of steps or phases. Within each phase, a portion of the instruction is processed by the processor hardware.

In one known pipeline system, the instructions are divided into a decode phase, an address transfer phase, an operand fetch phase and an execution phase. In the decode phase, the instruction is decoded and address information is used to generate addresses needed in the execution of the instruction. In the address transfer phase, the addresses are transferred internal to the machine to registers where they are needed in the next phase. In the operand fetch phase, the addresses are used to fetch operands, such as used for example in mathematical operations. In the execution phase, the operands fetched in the operand fetch phase and information generated into the decode phase are used to execute the instruction, for example by the operation of an arithmetic logic unit.

In a pipeline system, these various phases of instruction execution are performed sequentially for any one instruction but on an overlap basis for several sequentially occurring instructions in independently operating portions of the processor hardware. Thus, an instruction is fetched from memory and decoded in a first phase in one part of the processor while other phases of other instructions are executed in other parts of the processor. The hardware for the various phases is interconnected such that information created in one part of the processor in an earlier phase is communicated to another part of the processor for use in a later phase of the same instruction. The instruction execution hardware may be conveniently divided into an instruction section (I-unit) and an execution section (E-unit). The function of the I-unit is to decode the instruction and set up the internal hardware for completion of the instruction under control of the E-unit.

A well-recognized problem with pipeline systems is interference between successively executed instructions. One particular situation where this occurs is where a second instruction being decoded requires data in its decoding phase and the data is to be generated by a prior instruction which has not yet been fully executed. Interference detection circuitry typically compares information defining data to be used in a next instruction with the identity of data being modified by the previous instruction. If it appears that there will be a conflict, the decoding of the next instruction is delayed until the previous instruction has been fully executed. Such delays significantly reduce the efficiency of the processor. One particular instruction which tends to be the source of interference is an instruction used in many processors known as the Load Multiple Register (LMR) instruction. This instruction is used to move data from memory into a group of registers within the machine commonly known as the general registers. These registers are used by a variety of different instructions and it is common to load a number of these registers in anticipation of execution of a sequence of instruction which will use the contents of these registers. The LMR instruction typically requires several execution cycles and it is quite common that a next instruction following after the LMR instruction uses one of the general registers being loaded by the LMR instruction. In the prior art, the identity of the highest number and lowest number general registers to be loaded are recorded in the decode phase of the LMR instruction. A determination is made during the decode phase of the next sequential instruction as to whether a general register to be used in the decode phase of the next instruction is included in the range of registers to be changed by the LMR instruction. If so, the instruction processing for next sequential instruction is delayed until the last register involved in the LMR instruction has been loaded.

Many processors read data from memory in double words, e.g., eight bytes, and process double words in the internal data flow of the processor. The general registers, however, are typically single word, e.g., four bytes, registers. In executing the LMR instruction, two general registers are written in each cycle of the execution phase of the LMR instruction and in such a manner that a highest numbered one of the two registers is written from the lower order bytes of the double word data flow. Circuitry is typically provided which allows information written to a general register in the last execution cycle to be made simultaneously available to the I-unit for the operand fetch cycle of the next sequential instruction. With register modifying instructions, other than the LMR instruction, only one or two general registers are changed. In that case, when a previous instruction alters a register the identity of a modified register is written in the target register. The target register is further provided with an indication as to whether any general registers are changing, whether that general register and the next general register are changing or whether no general registers are changing. The contents of the target register is used to determine whether a delay needs to be introduced in the decode or operand fetch phase of the next instruction.

Many processors read double data words from memory and process double data words in the internal data flow but most instructions deal only with the lower order half of the data word. If the execution phase results of one instruction in one portion of the double word are needed in the operand fetch phase of the next instruction in the same portion of the double word, the results are made available for the next instruction during the execution phase of the prior instruction. In that case, the register is said to be by-passable. However, if the data in one portion of a double word are needed in another portion of the double word by the next instruction, the register is said to be not by-passable condition and the operand fetch phase of the next instruction be delayed until after completion of the execution phase of the previous instruction. This particular arrangement has been used whenever a previous instruction modifies the contents of one or two general registers. However, this arrangement has not been found to be applicable to the LMR instruction where a larger number registers are modified by a single instruction.

SUMMARY OF THE INVENTION

In accordance with this invention, the identity of the lowest numbered general register of a sequentially numbered subset of general registers affected by a register loading instruction is stored in an incrementing register. In each of the execution phases of the register loading instruction, the contents of the register are incremented and the identity of a register defined in a next instruction is compared with the contents of the incrementing register. The next instruction is allowed to proceed whenever the contents of the increment register is greater than the identity of the general register defined in the next instruction. Advantageously, in an LMR instruction which typically requires several cycles, the delay of the next sequential instruction is limited to the number of cycles required to load the general register identified by the next instruction, without the need to wait for the completion of the entire LMR instruction, as was done in the prior art. In a processor having 16 general registers, the LMR may require eight execution cycles since in most processors two registers are loaded in each cycle. There is high probability that a register needed by the next sequential instruction will be loaded before the completion of the execution of the LMR instruction and a number of cycles can be saved for the majority of the executed LMR instructions.

In accordance with one particular aspect of the invention, the identity of the highest numbered register or registers modified in the last execution cycle of a multiple register loading instruction is stored together with an indication as to whether one or two registers are written in the last execution cycle of the register loading instruction. Advantageously, based on this stored information, a determination can be made as to whether a general register can be bypassed and made available to the next instruction during execution of the last execution phase of the register loading instruction. Such a bypass is generally possible only if the next instruction requires the data in the portion of the processor data flow where it is positioned when written in the register by the register loading instruction. In accordance with this invention, a determination as to the position in the data flow of the contents of the required general register is made by determining whether the total number of registers loaded by the register loading instruction is an even number or an odd number. Such a determination is made by means of an exclusive-or circuit connected to the lowest order bits of the register storing the identity of the highest general register and the lowest general register.

BRIEF DESCRIPTION OF THE DRAWING

An illustrative embodiment of the invention will now be described with reference to the accompanying drawing, in which.

DETAILED DESCRIPTION

Figure 1:
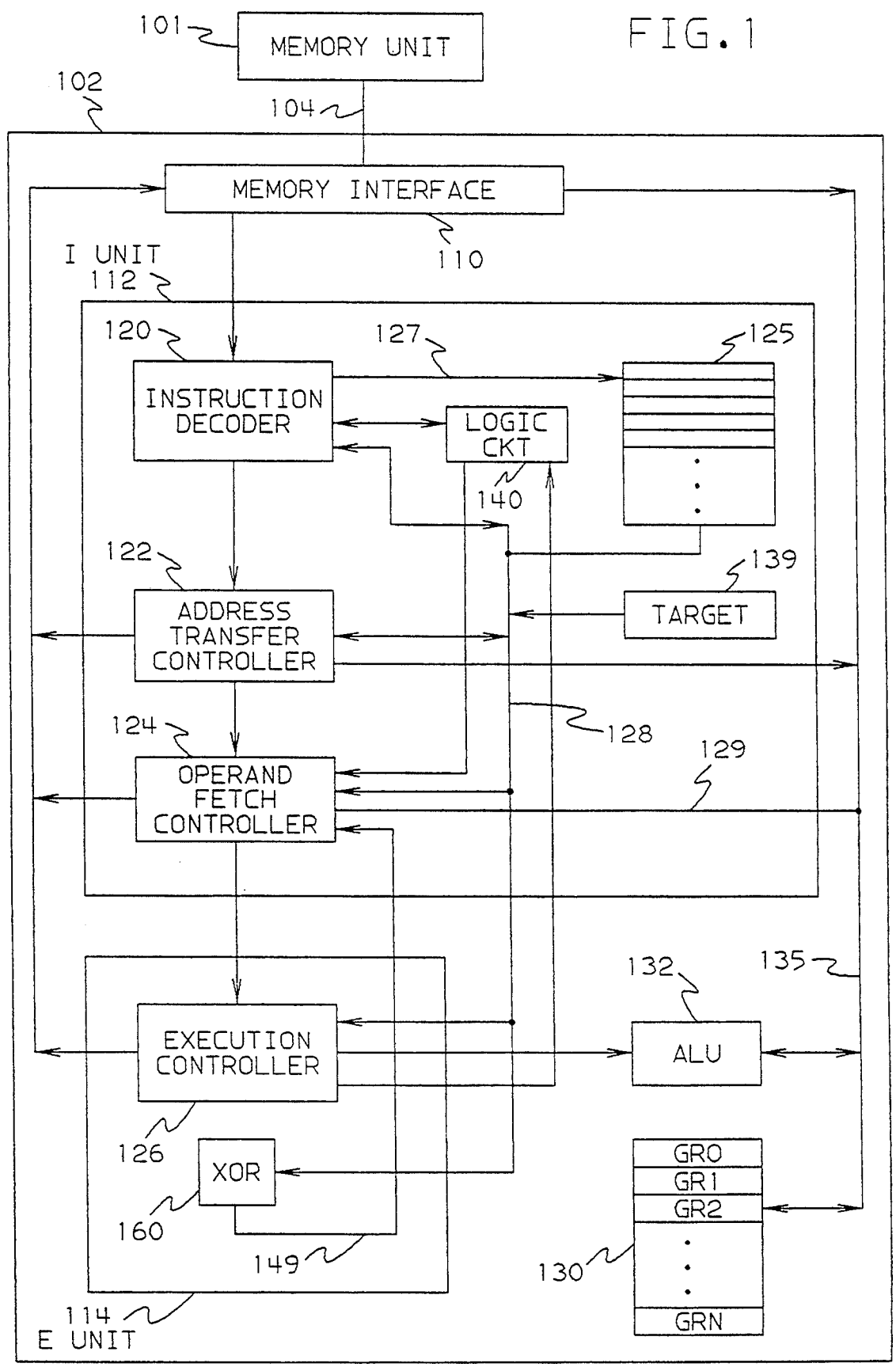
FIG. 1 is a block diagram representation of a data processing system including a processor incorporating the principles of the invention.

FIG. 1 is a block diagram representation of a data processing system including a memory unit 101 and a processor 102. The processor 102 includes a memory interface 110 by means of which the processor 102 communicates with the memory unit 101 over a memory bus 104. The processor 102 includes an instruction processing unit, the I-unit 112, which obtains and decodes instructions to be executed and provides appropriate control signals to an instruction execution unit, the E-unit 114, which executes the instructions. The processor 102 employs an instruction pipeline in which the decoding and execution of an instruction is divided into several stages or phases. Several instructions may be handled by the processor on a time overlap basis.

The I-unit 112 includes an instruction decoder 120, an address decoder 122 and an operand fetch controller 124. During instruction processing phases, the instruction and addresses are decoded in the instruction decoder 120 in a first or decode (D) phase of the pipeline, addresses involved in the instruction are transferred by the address transfer controller 122 in a second or address transfer (AT) phase of the pipeline, and operands involved in the instruction are fetched in the third or operand fetch (OF) phase of the pipeline under control of the operand fetch controller 124. In this manner, the operand fetch controller 124 may be operating on a first instruction, the address transfer controller 122 may be operating on a second instruction and instruction decoder 120 may be operating on a third instruction. The E-unit 114 receives signals from the I-unit and executes the instruction in a fourth or execution (EX) phase. For the complete execution of an instruction, generally, all four phases are required and four separate instructions may be operated upon by the controller 102 within a single machine cycle of the processor 102.

The I-unit 112 includes a hardware queue 125 connected to the instruction decoder 120 via cable 127 and connected to the execution controller 126 via cable 128. The instruction decoder 120 decodes an instruction obtained from memory and derives memory addresses and identifiers of internal registers and places the identifiers in the hardware queue 125 in the decode (D) phase. In the address transfer phase, the address transfer controller 122 transfers memory operand addresses to the memory interface 110 and the identity of internal registers involved in the instruction to the registers that address the internal registers. The internal registers of the processor 102 include a set of sequentially numbered set of general registers 130 as well as other internal registers such as registers in the arithmetic logic unit (ALU) 132. In the operand fetch phase, the operand fetch controller 124 fetches the memory data or register data defined by the addresses stored by the address transfer controller 122 and causes the corresponding data to be transferred to the appropriate registers of the register file 130 via the bus 135. In the execution phase, the execution controller 126 reads the hardware queue 125 and activates specific instruction execution units, such as the arithmetic logic unit 132 to perform specified functions.

While the circuitry of the I-Unit 112 and E-Unit 114 operate substantially independently of each other, conflicts may arise because two instructions require the use of the E-Unit at the same time or, for subsequent instructions, the I-Unit requires information from a previous instruction before that previous instruction has been fully executed. More specifically, a conflict may arise when contents of a register needed by the instruction decoder 120 during the decode phase of one instruction is modified by a previous, uncompleted instruction. Another source of conflict is when the contents of a register needed by the operand fetch controller 124 during the operand fetch phase of an instruction is modified by a previous, uncompleted instruction. Such conflicts are resolved by means of a well-known conflict resolver circuit in the instruction decoder 120 which examines adjacent information blocks in the queue 125 and temporarily delays certain of the I-Unit or E-Unit functions by means of control signals on cable 128.

The decode (D) phase of an instruction may require the calculation of an address using an internal register which is modified by a previous instruction. Thus, in such a case, the D phase of the next instruction must be delayed until the execution of the prior instruction has been completed. One commonly used instruction in data processors is the Load-Multiple-Register (LMR) instruction. This instruction involves the loading of a sequentially numbered subset of the set of general registers 130. These general registers are commonly used with several different instructions and are periodically set up prior to a particular instruction or sequence of instructions which will use their contents. While the problem of delaying execution of the D phase of an instruction may occur any time that a previous instruction modifies a necessary register in its execution (E) phase, the problem is more pronounced with the LMR instruction. In many processors, there are a substantial number of the general registers, e.g. 16, which may be loaded by a single LMR instruction.

When the LMR instruction is decoded by the instruction decoder 120, the decoder 120 inserts in the hardware queue 125 the pertinent data to be used in the subsequent phases of that instruction, including the identity of the highest and lowest general registers involved in the instruction. The instruction decoder 120, in decoding a next sequential instruction (NSI) which involves a general register, performs a test to determine whether the general register to be used falls within the group of registers defined by the identities of the highest and lowest registers. If not, no delay of decode phase is required.

Figure 2:
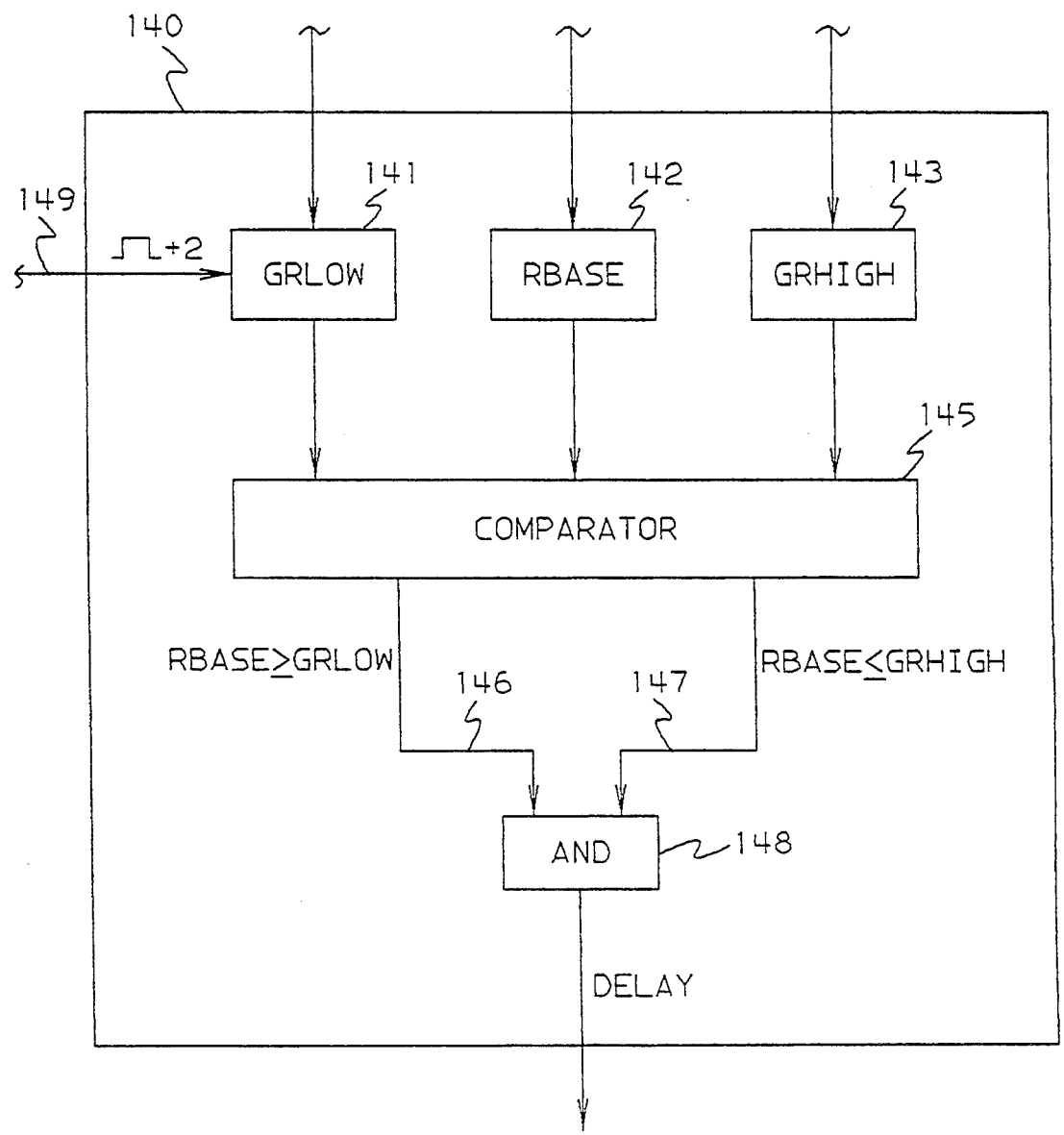
FIG. 2 is a more detailed block diagram representation of a logic circuit of FIG. 1.
Figure 3:
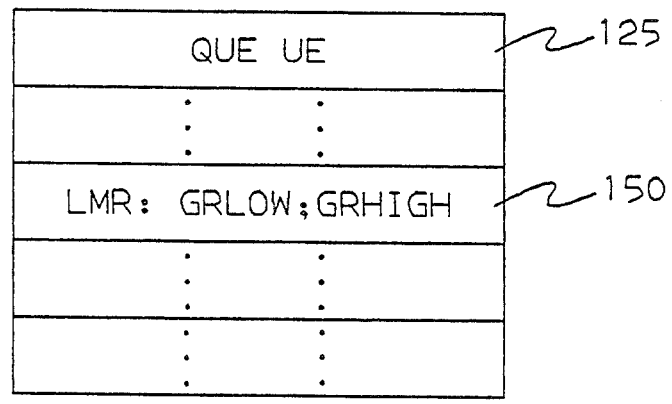
FIG. 3 is a representation of a hardware queue in the processor of FIG. 1.

FIG. 2 is a more detailed block diagram of the logic circuit 140 in the I-unit 112 of FIG. 1. FIG. 3 is a representation of a part of the hardware queue 125 showing a particular entry 150 pertaining to the LMR instruction. This entry includes a coded definition of the LMR instruction as well as binary data representing the address of the lowest general register (GRLOW) and of the highest general register (GRHIGH) involved in the particular LMR instruction. The logic circuit 140 includes an incrementing register 141, which stores the binary representation of GRLOW. Two other registers, 142 and 143, in logic circuit 140 store a binary representation of the identity of a base register (RBASE) involved in the next sequential instruction and the binary representation of the identity of the highest register (GRHIGH) involved in the LMR instruction. In this illustrative embodiment RBASE is represented as a separate register 142, it may also taken as a field of the instruction register (not shown in the drawing) of the decoder 120. A comparator 145 compares the contents of registers 141 (GRLOW) and 142 (GRBASE) and provides an output or conductor indicating whether the binary value of the base register of the next instruction is equal to or greater than the binary value of the lowest register. The comparator 145 further compares registers 142 and 143 and provides an output or conductor 147 indicating whether the binary value of the base register of the next sequential instruction is less than or equal to the binary value of the highest register of the LMR instruction. The two comparator outputs on conductors 146 and 147 are combined by means of AND gate 148. If the delay output of gate 148 is a logical one, instruction processing for the next instruction must be delayed for at least the next cycle.

Figure 4:
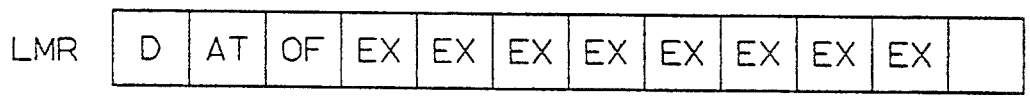
FIGS. 4, 5 and 8 are sequence diagram representations of pipeline sequences in the processor of FIG. 1.
Figure 4:
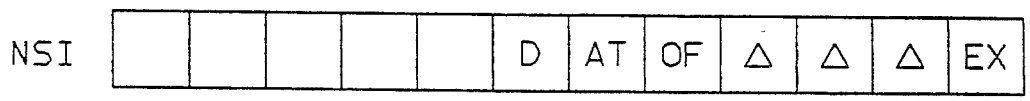

An output signal from the execution controller 126 on conductor 149 provides an increment pulse to the increment register 141 each time a double data word is obtained from memory and stored in a pair of the general registers. In this manner, the binary value of the lowest general register in register 141 is incremented by 2 each time a pair of general registers is loaded. When the incremented binary value of the contents of register 141 exceeds the binary value of the identity of the base register in register 142, the output on conductor 146 will be a 0 showing that RBASE is less than GRLOW. Consequently, the delay output of gate 148 will become 0 and the delay is terminated. In this fashion, the decoding or operand fetching of the next instruction can commence as soon as the base register has been properly loaded, and without waiting for the remainder of the general registers to be loaded by the LMR instruction. FIG. 4 is a sequence chart representation of the execution of an LMR instruction followed by a next sequential instruction. FIG. 4 shows processing of the decode, address transfer and operand fetch phases of the next sequential instructions during the several cycles of the execution phase of the LMR instruction, which can proceed as soon as the delay signal output of gate 148 changes. Thus, several machine cycles are saved over the case where the processing of the next sequential instructions has to wait for completion of the LMR instruction.

Figure 5:
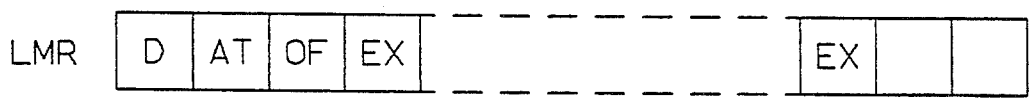
Figure 5:
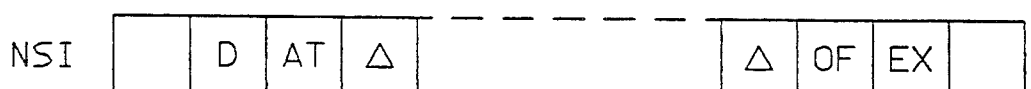
Figure 6:
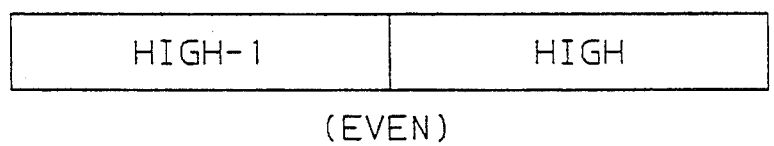
FIGS. 6 and 7 are representation of a double data word in the processes of FIG. 1
Figure 7:
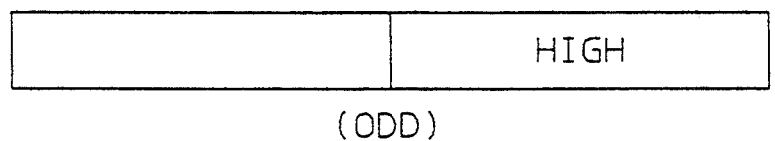

During the execution of an LMR instruction, an indication of the identity of the general register or registers modified in the last cycle of the EX phase of the LMR instruction is stored in the target register 139 Further, an indication is provided as to whether one or two registers are affected by the last execution cycle. This information is used by the instruction decoder 120 to determine whether the identified register or registers are by-passable. In the execution of the LMR instruction, double length data words are transferred from the memory interface 110 via bus 135 to general registers 130 and written into two consecutively numbered registers. The higher numbered register is loaded from the lower order bytes of the double word and the lower numbered register is loaded from the higher order bytes. It will be apparent that if an even number of general registers is loaded by the LMR instruction, two general registers will be affected by the last LMR execution cycle. In that case, the double length data word loaded in the last LMR execution cycle will contain the contents of the highest numbered register in its low order bytes and the contents of the next lower general register in its high order bytes, as represented in FIG. 6. Similarly, if an odd number of general registers are being loaded by the LMR instruction, then only one of the general registers will be affected by the last EX cycle of the LMR instruction. In that case, the contents of the highest numbered register will be in the low order bytes of the double data word, as represented in FIG. 7. While a next sequential instruction may require the contents of a general register modified in the last cycle of the LMR instruction either in the upper or in the lower bytes of the data flow, it is most frequently the case that it will be needed in the lower bytes. Thus, when an odd number of registers are loaded by the LMR instruction and the next sequential instruction requires the contents of the highest numbered register instruction in the lower bytes of the double word data flow, the highest numbered register is always by-passable. In that event, the contents of the highest numbered register can be passed to the operand fetch controller 124 via bus 135 and cable 129. Accordingly, the OF phase of the next instruction can be executed simultaneously with the last execution cycle of the LMR instruction. This is illustrated in the sequence diagram of FIG. 5 which shows the simultaneous occurrence of the last cycle of the EX phase of the LMR instruction and the OF phase of the next sequential instruction.

Figure 8:
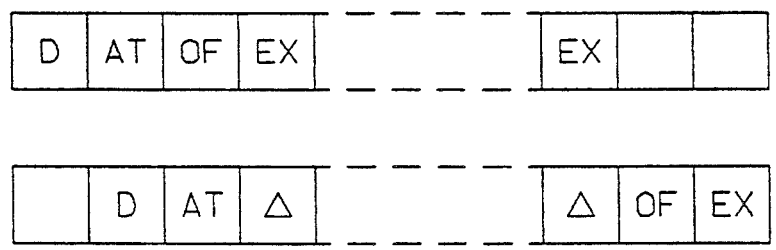

If an even number of registers are loaded by the LMR instruction the next-to-highest numbered register is not by-passible if it is needed in the lower order bytes of the data flow for next instruction. Accordingly, the OF phase of the next instruction has to delayed beyond the last EX phase of the LMR instruction, as depicted in FIG. 8. In case the next sequential instruction requires the contents of one of the registers loaded in the last execution cycle of the LMR instruction in the upper bytes of the double word data flow, the highest numbered register is never by-passable. In the event that an even number of registers are loaded by the LMR instruction, the next-to-highest numbered register is by-passable if the data is needed on the higher order bytes of the data flow.

To determine whether an even number or odd number of general registers are being loaded by the LMR instruction, an exclusive-or circuit 160 in processor 102 examines the low order bits of the address fields of the highest and lowest numbered registers involved in the instruction. A "1" output indicates that an even number of registers are loaded and a "0" indicates that an odd number of general registers are being loaded. The output of exclusive or circuit 160 is used together with the contents of the target register 139 to determine when the next-to-highest numbered register by-passable.

It will be understood that the embodiment described herein is only illustrative of the principles of the invention and that other arrangements can be devised by those skilled in the art without departing from the spirit and scope of the invention.

What we claim is:

1. A data processor comprising;
    a plurality of processor registers including a plurality of sequentially numbered general registers;
    a storage register;
    an instruction processing unit responsive a predefined instruction defining a sequentially numbered subset of the general registers to be loaded for storing in the storage register a lowest register number defining the lowest numbered register of the subset and a highest register number defining the highest numbered register of the subset and for generating, in a first time cycle, first instruction control signals for execution of the predefined instruction; and
    an instruction execution unit responsive to the first instruction control signals to selectively write data into the registers defined in the predefined instruction in a predetermined number of sequentially occurring time cycles and to increment the lowest number defining the lowest numbered register of the subset stored in the storage register in each of the predetermined number of time cycles;
    the instruction processing unit responsive to a next sequential instruction defining a specified one of the general registers to compare the number of the specified one of the general registers with the incremented lowest register number and the highest register number stored in the number register in each of the predetermined number of time cycles and generating second instruction control signals for execution of the next sequential instruction when the number of the specified one of the general registers falls outside of a range of numbers defined by the incremented lowest number and the highest number stored in the storage register.

2. The data processor in accordance with claim 1 wherein the instruction processing unit comprises a comparator circuit for comparing the number of the specified one of the general registers with the incremented lowest register number and the number of the highest numbered register stored in the storage register and for generating a comparator output signal indicative of whether the number of the specified one of the registers falls outside the range of numbers defined by the incremented lowest number and the highest number stored in the storage register.

3. The data processor in accordance with claim 2 wherein the instruction unit comprises an instruction decoder circuit for generating instruction control signals in a first instruction processing phase, an address transfer circuit for transferring addresses to selected processor registers, in a second instruction processing phase occurring subsequent to the first instruction processing phase, and an operand fetch circuit for generating memory access control signals during a third instruction processing phase occurring subsequent to the second instruction processing phase, and wherein the instruction processing unit is responsive to the comparator output signal to selectively delay operation of the decoder circuit.

4. The data processor in accordance with claim 2 wherein the instruction unit comprises an instruction decoder circuit for generating instruction control signals in a first instruction processing phase, an address transfer circuit for transferring addresses to selected processor registers, in a second instruction processing phase occurring subsequent to the first instruction processing phase, and an operand fetch circuit for generating memory access control signals during a third instruction processing phase occurring subsequent to the second instruction processing phase, and wherein the instruction processing unit is responsive to the comparator output signal to selectively delay operation of the fetch operand circuit.

5. The data processor in accordance with claim 1 wherein a plurality of sequentially performed execution cycles are required for the execution of the predefined instruction and further comprising a logic circuit responsive to bits of the storage register defining the lowest register number and the highest register number to generate a predetermined output signal when data is written into more than one register in the last of the plurality of execution cycles and wherein the instruction processing unit is responsive to the predetermined output signal to selectively pass data written into one of the subset of registers in the last execution cycle to another processor register during the last execution cycle.

6. The data processor in accordance with claim 5 wherein the logic circuit comprises an exclusive-or circuit generating a first output when the total number of registers of the subset is an odd number and a second output when the total number of registers of the subset is an even number.

7. A data processor system comprising a memory storing instructions and data including a load multiple register (LMR) instruction defining a plurality of sequentially numbered general registers and a plurality of associated LMR data words and including a next sequential instruction (NSI) defining one of the sequentially numbered general registers, the data processor comprising;

a plurality of processor registers, including a plurality of sequentially numbered general registers;

a memory interface responsive to memory read control signals for reading the LMR instruction and data words from memory;

an instruction information storage unit;

an instruction unit responsive to the LMR instruction read from memory for generating LMR instruction control signals and storing in the instruction information storage unit the number of a lowest numbered general register and the number of the highest numbered general register defined in the LMR instruction, in a first time cycle, and responsive to the NSI read from memory subsequent thereto to compare the number of the general register defined in the NSI instruction with the range defined by the numbers of the lowest numbered register and the highest numbered register, in a second time cycle, and for generating NSI instruction control signals if the number of the general register defined in the NSI is less than the number of the lowest numbered general register stored in the instruction information storage unit;

increment circuitry responsive to increment signals to increment the number of the lowest numbered general register stored in the instruction information storage unit;

data processing circuitry responsive to data processing control signals to selective transfer data within the processor and to perform predetermined logic functions on data in the processor;

an execution unit responsive to the LMR instruction control signals to generate memory read control signals and data processing control signals to cause the memory interface to perform a plurality of data fetch operations to fetch a plurality of LMR data words and data processing control signals to cause the data processing circuitry to transfer data words read from memory to registers defined in the LMR instruction in a plurality of predefined time cycles and generating an increment control signal during each of the predefined time cycles to cause the number of the lowest numbered register stored in the information storage unit to be incremented in each of the predefined time cycles;

the instruction unit responsive to an incremented value of the number of the lowest numbered register in the instruction information storage unit to selectively generate the NSI instruction control signals.

8. The data processor system in accordance with claim 7 wherein the instruction unit comprises an instruction decoder circuit for generating instruction control signals in a first instruction processing phase, an address transfer circuit for transferring instruction associated addresses to selected processor registers in a second, subsequently occurring instruction processing phase and an operand fetch circuit for fetching instruction associated operand data from memory in a third instruction processing phase, occurring subsequent to the second instruction handling phase, and wherein the instruction unit is responsive to the NSI instruction to selectively delay operation of the decoder circuit and the operand fetch circuit until the range defined by the incremented value of the lowest numbered general register and the number of the highest numbered register does not include the register identified in the NSI instruction.

9. The data processor system in accordance with claim 7 and wherein a plurality of sequentially performed execution cycles are required for the execution of the LMR instruction further comprising a logic circuit responsive to bits of the instruction information storage unit defining the number of the lowest numbered register and the number of the highest numbered register to generate a predetermined output signal when data is transferred to more than one of the general registers in the last of the plurality of execution cycles and wherein the instruction unit is responsive to the predetermined output signal to selectively pass data transferred in the last execution cycle to another processor register during the last execution cycle.

10. The data processor system in accordance with claim 9 wherein the logic circuit comprises an exclusive-or circuit generating a first output when the total number of general registers defined by the LMR instruction is an odd number and a second output when the total number of general registers defined by the LMR instruction is an even number.

* * * * *